United States Patent
Lepez et al.

(10) Patent No.: US 11,845,661 B2
(45) Date of Patent: Dec. 19, 2023

(54) DEVICE FOR PRODUCING DIHYDROGEN, METHOD FOR PRODUCING DIHYDROGEN USING SUCH A DEVICE AND USE OF SUCH A DEVICE

(71) Applicant: E.T.I.A.—EVALUATION TECHNOLOGIQUE, INGENIERIE ET APPLICATIONS, Compiegne (FR)

(72) Inventors: Olivier Lepez, Lamorlaye (FR); Philippe Sajet, Lacroix Saint-Ouen (FR)

(73) Assignee: E.T.I.A.—EVALUATION TECHNOLOGIQUE, INGENIERIE ET APPLICATIONS, Compiegne (FR)

( * ) Notice: Subject to any disclaimer, the term of this patent is extended or adjusted under 35 U.S.C. 154(b) by 593 days.

(21) Appl. No.: 16/343,294

(22) PCT Filed: Oct. 18, 2016

(86) PCT No.: PCT/EP2016/074940
§ 371 (c)(1),
(2) Date: Apr. 18, 2019

(87) PCT Pub. No.: WO2018/072816
PCT Pub. Date: Apr. 26, 2018

(65) Prior Publication Data
US 2019/0256354 A1    Aug. 22, 2019

(51) Int. Cl.
*C01B 3/50* (2006.01)
*C10J 3/00* (2006.01)
*C10J 3/84* (2006.01)
*C10K 3/00* (2006.01)
(Continued)

(52) U.S. Cl.
CPC ............ *C01B 3/508* (2013.01); *C01B 3/50* (2013.01); *C10J 3/007* (2013.01); *C10J 3/84* (2013.01);
(Continued)

(58) Field of Classification Search
CPC ............ C01B 3/508; C01B 3/50; C10J 3/007
(Continued)

(56) References Cited

U.S. PATENT DOCUMENTS

| | | | |
|---|---|---|---|
| 2002/0048545 A1* | 4/2002 | Lewis | C10J 1/207 423/418.2 |
| 2007/0111051 A1* | 5/2007 | Muradov | C01B 3/506 429/411 |

(Continued)

FOREIGN PATENT DOCUMENTS

| | | | |
|---|---|---|---|
| EP | 2 690 162 A1 | 1/2014 | |
| FR | 2 774 545 A1 | 8/1999 | |

(Continued)

*Primary Examiner* — Douglas B Call
(74) *Attorney, Agent, or Firm* — Muncy, Geissler, Olds & Lowe, P.C.

(57) ABSTRACT

The invention relates to a device for producing a dihydrogen gas including an enclosure, means for conveying the product into the enclosure, which comprise a screw mounted so as to rotate in the enclosure about a geometric axis of rotation, means for heating the screw by the Joule effect, and a unit for removing impurities present in the gas. The invention also relates to a method for manufacturing dihydrogen using such a device as well as to a use of the device for the treatment of a product such as CSR material or polymer material.

13 Claims, 2 Drawing Sheets

(51) Int. Cl.
*C10K 1/02* (2006.01)
*B01D 53/047* (2006.01)
(52) U.S. Cl.
CPC ............... *C10K 1/02* (2013.01); *C10K 3/008* (2013.01); *B01D 53/047* (2013.01); *C01B 2203/0272* (2013.01); *C01B 2203/04* (2013.01); *C01B 2203/043* (2013.01); *C01B 2203/047* (2013.01); *C01B 2203/048* (2013.01); *C01B 2203/0475* (2013.01); *C01B 2203/0811* (2013.01); *C10J 2300/0946* (2013.01); *C10J 2300/123* (2013.01); *C10K 1/024* (2013.01); *C10K 1/026* (2013.01)
(58) Field of Classification Search
USPC ..................................................... 423/648.1
See application file for complete search history.

(56) References Cited

U.S. PATENT DOCUMENTS

| 2010/0276271 A1* | 11/2010 | Dinnematin | C10B 53/07 202/117 |
| 2012/0027662 A1* | 2/2012 | Bratina | C10J 3/007 585/800 |
| 2014/0284198 A1* | 9/2014 | Lepez | C10B 53/07 201/19 |

FOREIGN PATENT DOCUMENTS

| WO | WO 2010/128055 A1 | 11/2010 |
| WO | WO 2013/053380 A1 | 4/2013 |
| WO | WO 2016/193274 A1 | 12/2016 |

* cited by examiner

DEVICE FOR PRODUCING DIHYDROGEN, METHOD FOR PRODUCING DIHYDROGEN USING SUCH A DEVICE AND USE OF SUCH A DEVICE The invention relates to a device for producing dihydrogen gas, i.e. gas having hydrogen as its main component. The invention also relates to the use of such a device for recycling a substance of refuse derived fuel (RDF) material or polymer material type. The invention also relates to a method of fabricating dihydrogen gas by using such a device.

TECHNOLOGICAL BACKGROUND OF THE INVENTION

Dihydrogen is used in numerous fields in industry, in particular in the chemical and petrochemical industries, e.g. for refining hydrocarbons. The use of dihydrogen as fuel is being envisaged more and more and is being used both in the automotive field and in the field of fuel cells.

Although natural dihydrogen deposits exist, most of the dihydrogen used is dihydrogen that has been manufactured industrially, given the relative difficulty in extracting and storing dihydrogen, which is a very light gas.

There therefore exists a continuing need for a device enabling dihydrogen gas to be manufactured in relatively simple manner.

OBJECT OF THE INVENTION

An object of the invention is to provide a device enabling dihydrogen gas to be generated and also the use of that device for recycling substances of RDF material or polymer material type. Another object of the invention is to propose a method of manufacturing dihydrogen gas by using such a device.

BRIEF SUMMARY OF THE INVENTION

In order to achieve this object, there is provided a device for producing dihydrogen gas by applying heat treatment to a substance in the form of divided solids, the device comprising:
- an enclosure having an inlet for feeding it with the substance, a low outlet for recovering residues from the treated substance, and a high outlet for extracting the gas resulting from the treatment of the substance;
- conveyor means for conveying the substance between the inlet of the enclosure and the low outlet of the enclosure, which means comprise a screw mounted to rotate inside the enclosure about an axis of rotation and includes means for driving the screw in rotation;
- heater means for heating the screw by the Joule effect;
- an impurity elimination unit for eliminating impurities present in the gas, said unit being connected to the high outlet of the enclosure.

As a result, the substance is introduced via the inlet of the enclosure in the form of divided solids and the screw pushes the divided solids continuously towards the low outlet of the enclosure. Because of the advantageous heating of the screw by the Joule effect, the divided solids heat up very quickly and become transformed without sticking to the turns of the screw, thereby generating a gas that, once processed by the unit, presents, in surprising manner, a high content of dihydrogen.

Experiments carried out by the Applicant have enabled dihydrogen contents at the outlet from the elimination unit to be obtained at about 60%, depending on the feed substance.

The gas with a high concentration of dihydrogen as obtained by the invention is thus a very good alternative to natural dihydrogen gas.

Furthermore, the dihydrogen gas at the outlet from the invention is suitable for being injected directly into containers (cylinders, tanks, . . . ) or into a gas distribution network.

Also, the invention can be fed with substances of all kinds, such as biomass, and it is found to be particularly advantageous with substances of RDF material type or of polymer material type, such as plastics. This is found to be particularly advantageous in the ever more important context of recycling waste, in particular waste that is not suitable for being fermented and for which recycling solutions are less well developed.

In the meaning of the invention, the term "dihydrogen gas" is used to designate a gas having dihydrogen as its majority component, but it should be understood that said gas may include small proportions of other components, such as methane.

In a particular aspect of the invention, the device further comprises, at the outlet from the elimination unit, a system for purifying the dihydrogen gas, the purification system being connected to the elimination unit.

In a particular implementation, the device includes an inlet chimney stack that is connected to the inlet of the enclosure and that includes sealed connection means connected to the inlet of the enclosure in such a manner as to limit the entry of air into the enclosure.

In a particular aspect of the invention, the device includes an outlet chimney stack that is connected to the low outlet of the enclosure and that includes sealed connection means connected to the low outlet of the enclosure in such a manner as to limit the entry of air into the enclosure.

In a particular aspect of the invention, the impurity elimination unit includes cracking means for cracking the gas.

In a particular aspect of the invention, the impurity elimination unit includes filter means for filtering dust and solid particles present in the gas.

In a particular aspect of the invention, the filter means comprise a high-temperature cyclone or a high-temperature ceramic filter or an active carbon filter.

In a particular aspect of the invention, the purification system comprises a single purification stage.

In a particular aspect of the invention, the purification system includes a pressure swing adsorption apparatus.

In a particular implementation, wherein an exhaust gas from the purification system is used by the elimination unit to treat the gas coming from the treatment of the substance.

Furthermore, the invention provides the use of the above specified device for recycling a substance of the RDF material or polymer material type.

Furthermore, the invention also provides a method of manufacturing a dihydrogen gas from such a device, the method comprising the steps of:
- pyrolyzing the substance; and
- eliminating the impurities present in the gas.

BRIEF DESCRIPTION OF THE DRAWINGS

The invention can be better understood in the light of the following description given with reference to the accompanying figures, in which.

DETAILED DESCRIPTION OF THE INVENTION

Figure 1:
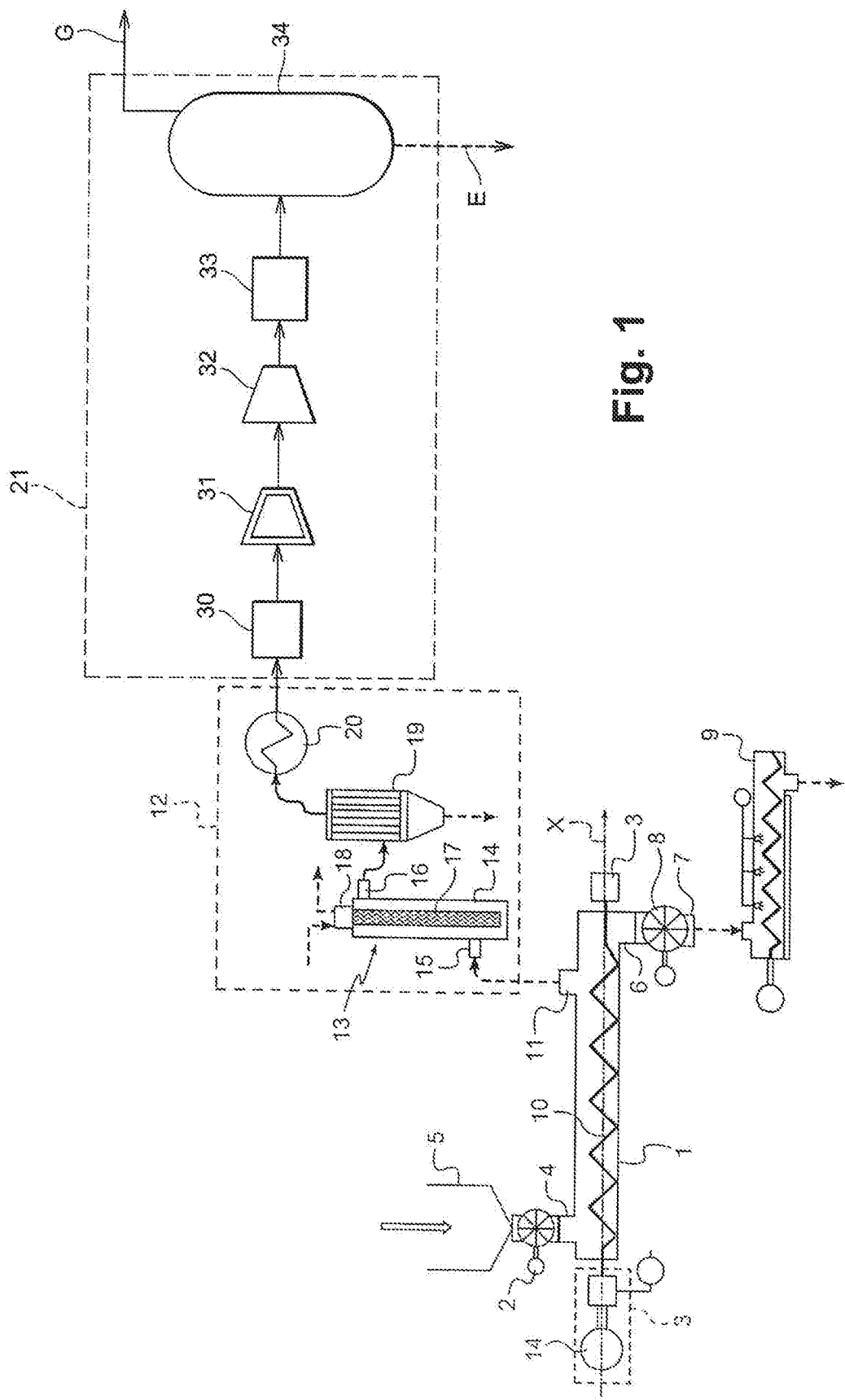
FIG. 1 is a diagrammatic view of a device in a particular, non-limiting embodiment of the invention.

With reference to FIG. 1, the device in a particular embodiment of the invention serves to produce dihydrogen gas by heat treatment, specifically pyrolysis, applied to a substance in the form of divided solids.

By way of example, the substance may be made of polymer material. The substance is typically a plastics material comprising a majority of polyethylene and of polyethylene terephthalate. In particular manner, the divided solids are in the form of three-dimensional granules referred to as granules or pellets. The maximum dimensions of said divided solids preferably lie in the range 2 millimeters (mm) to 30 mm. The device of the invention comprises an enclosure 1, having a general direction that is essentially horizontal, that is held above the ground by stands (not shown herein). The enclosure 1 has an outer shell, comprising a single unit in this example, and made by way of example out of metal, in particular made out of non-magnetic stainless steel. In a particular embodiment, the enclosure 1 also has an inner shell in the form of a unit made of refractory material. An equipment box 3 is fastened to each of the ends of the enclosure 1.

In this example, the enclosure 1 has an inlet 4 for feeding substance to the enclosure 1, which inlet 4 is arranged in the cover of the enclosure 1, substantially at a first end of the enclosure 1.

Naturally, the bottom and the cover of the enclosure 1 are defined relative to the ground on which the enclosure 1 stands.

In a particular embodiment, the device has an inlet chimney stack 5, which is connected to the inlet 4 of the enclosure.

Preferably, the inlet chimney stack 5 has sealed connection means 2 connected to the inlet 4 of the enclosure 1 so as to limit entry of air into the enclosure 1, which air would reduce the dihydrogen content of the gas leaving the enclosure, which is not described. The sealed connection means 2 serve also to control the flow rate of substance poured into the enclosure 1. By way of example, said sealed connection means 2 comprise an airlock arranged between the inlet chimney stack 5 and the inlet 4 of the enclosure 1, and controlled by means of valves.

By way of example, the inlet chimney stack 5 is connected to a feed hopper or indeed to a unit for grinding, compacting, or granulating the divided solids substance, or indeed to a unit for preconditioning the divided solids, where a preconditioning unit serves to heat and/or dry the divided solids to meet prescribed values for temperature and relative humidity, or indeed to densify said divided solids.

The enclosure 1 also has a low outlet 6 arranged in this example in the bottom of the enclosure 1 substantially at the second of the two ends of the enclosure 1. In a particular embodiment, the device has an outlet chimney stack 7 that is connected to the low outlet 6 of the enclosure 1.

The outlet chimney stack 7 preferably has sealed connection means 8 for connection to the low outlet 6 of the enclosure 1 so as to limit entry of air into the enclosure 1, which air would lead to a reduction in the dihydrogen content of the gas at the outlet from the enclosure 1, which is not desirable. These sealed connection means 8 also serve to control the discharge rate of residue from the substance that is subjected to heat treatment in the enclosure 1. Said sealed connection means 8 may for example comprise an airlock arranged between the outlet chimney stack and the low outlet, and controlled by means of valves.

By way of example, the outlet chimney stack 7 is connected to a cooling unit 9 for cooling the residue, either for the purpose of destroying the residue or else for the purpose of recycling said residue, which might for example be suitable for use as fuel, possibly after one or more additional treatment steps.

Furthermore, the device has conveyor means for conveying the substance between the inlet of the enclosure and the low outlet of the enclosure. Said means thus comprise a screw 10 that extends in this example inside the enclosure 1 along an axis X between the two equipment boxes 3 and that is mounted to rotate about said axis X inside the enclosure 1. By way of example, the screw 10 is made of refractory stainless steel. The screw 10 can thus withstand high temperatures typically lying in the range 700° C. to 1200° C. In this example, the screw 10 is in the form of a helical coil that is secured, e.g. by welding, at its two ends to ends of shaft segments. Each of said shaft segments is connected at its other end, by means of a flange, to a shaft that passes coaxially through the associated end equipment box.

The conveyor means also include rotary drive means for driving the screw 10 in rotation about the axis X, which means are arranged in this example in one of the equipment boxes 3. According to a particular aspect of the invention, the rotary drive means comprise an electric motor 14 and mechanical connection means between the outlet shaft of the motor and an end of the associated coaxial shaft, the coaxial shaft in turn driving the screw 10. In this example, the rotary drive means include means for controlling the speed of rotation of the outlet shaft of the motor, e.g. comprising a variable speed drive. The control means thus serve to adapt the speed of rotation of the screw 10 to the substance being conveyed, i.e. to adapt the transit time of the substance in the enclosure 1.

The device also has heater means for heating the screw 10 by the Joule effect, which means are arranged in this example in the equipment boxes 3. In a particular embodiment, the heater means include current generator means for generating electric current and means for connecting the two ends of the screw to two polarities of said generator means. For this purpose, each of the shafts on the axis is rigidly secured to a coaxial drum made of electrically conductive material, with carbon brushes rubbing thereagainst to supply electric currents, the brushes being connected by conductor wires (not shown) to the means for generating electric current. The screw 10 thus passes the same current all along the axis X.

The screw 10 is preferably shaped in such a manner as to present electrical resistance that varies along its axis X, thereby making it possible to obtain different heating zones simultaneously along the axis X. In particular manner, the screw 10 is thus shaped so as to have a temperature profile such that the temperature at the inlet 4 to the enclosure 1 is higher than the temperature at the outlet 6, 11 of the enclosure 1. This serves to limit divided solids made of plastics material sticking on the turns of the screw 10 when they enter into the enclosure 1, as can happen as a result of said divided solids melting under the heating action of the screw 10.

In a particular aspect of the invention, the heater means include regulator means for regulating the magnitude of the current passing through the screw 10. In this example, the regulator means comprise a dimmer interposed between the current generator means and the connection means. The regulator means thus make it possible for the current passing along the screw 10 to be adapted to the substance being conveyed.

The enclosure 1, the conveyor means, and the power supply means in this example thus form a pyrolysis reactor for the substance that is introduced into the enclosure 1.

Furthermore, the enclosure 1 also has a high outlet 11 for extracting gas resulting from pyrolyzing the substance, said high outlet 11 being arranged in this example in the cover of the enclosure 1 substantially at the second of the two ends of the enclosure 1. In this example, the high output 11 is located a little upstream from the low outlet of the enclosure 1 relative to the inlet 4 of the enclosure.

The device also has an impurity eliminator unit 12 for eliminating impurities present in the gas. Said unit 12 is connected to the high outlet 11 so that the gas is extracted continuously from the enclosure 1 (unlike the inlet 4 and the low outlet 6 which are shaped in such a manner that the supply of substance and the removal of residues can take place in discontinuous manner).

According to a particular aspect of the invention, the impurity eliminator unit 12 comprises gas cracking means that are directly connected to the high outlet 11 of the enclosure 1 in this example.

These cracking means serve to crack the tars and the oil phases present in the gas so as to recover a cleaner gas at the outlet from the cracking means.

By way of example, the cracking means comprise a cracking furnace 13.

With reference to FIG. 1, the cracking furnace 13 comprises a tubular structure 14 having a vertical axis Y. In this example, the structure 14 is also shaped so as to present a section that is circular (which section is normal to the axis Y).

The structure 14 has an inlet 15 for inserting the gas that is to be treated, with the inlet 15 in this example being connected to the outlet 11 of the enclosure 1.

The structure 14 also has an outlet 16 through which the gas is discharged. The inlet 15 is arranged in the bottom portion of the structure 15 and the outlet 16 is arranged in the top portion of the structure 15.

In particular manner, the inlet 15 extends substantially tangentially relative to the structure 14. The inlet 15 is thus arranged so as to cause the gas to penetrate into the structure 14 along the inside wall of the structure 14. This serves to generate a cyclone effect so that the gas flows helically inside the structure 14. This enhances the treatment of the gas.

Preferably, the outlet 16 is also arranged tangentially relative to the structure 14. The inlet 15 and the outlet 16 are preferably arranged radially relative to the structure 14 and in opposite directions to each other in order to facilitate the flow of the gas for treatment throughout the structure 14.

In preferred manner, the structure 14 is made of refractory material. The inside walls of the structure 14 thus present good thermal radiation properties. More precisely, in this example, the structure 14 is made of ceramic. The ceramic selected for the structure 14 preferably has power density per unit area lying in the range 10 kilowatts per square meter ($kW/m^2$) to 50 $kW/m^2$. By way of example, the selected ceramic may be alumina. The material of the structure 14 could also be refractory concrete capable of withstanding a temperature of at least 1400° C. The cracking furnace 13 also has discharge means for discharging parasitic solid particles, if any, such as dust contained in the gas for treatment. The Applicant has observed that in reality a large fraction of such solid particles are semicrystalline carbon particles formed by the cracking process itself. The device thus serves to produce semicrystalline carbon particles (from an initial substance based on RDF or plastics waste) that may subsequently optionally be recycled.

To this end, the discharge means in this example comprise a discharge pipe 40 and a valve 41, e.g. a valve of rotary, guillotine, or double-airlock type, arranged in said discharge pipe 40. The valve 41 serves to ensure that the structure 14 is sealed so as to limit entry of oxygen into the structure 14 via the discharge pipe 40, where oxygen would harm cracking. The discharge pipe 6 in this example extends from the bottom 42 of the structure 42 to the outside of the structure 14. The discharge pipe 40 in this example is arranged so as to open out at an end substantially in the center of said bottom 42 of the structure 14. In this example, the discharge pipe 40 extends along the axis Y.

It thus suffices merely to open the valve 40 in order to allow the solid particles to drop out from the structure 14. The bottom 42 of the structure 14 is preferably concave so as to form a funnel that serves not only to provide better storage of the solid particles, but also to facilitate discharging these particles via the discharge pipe 40 opening out into the funnel.

Furthermore, the cracking furnace 13 has heater means for heating said gas for treatment, which means comprise in particular a heater tube 17. The heater tube 17 is shaped so as to extend vertically along the axis Y inside the structure 14, coaxially with said structure 14. The heater tube 17 in this example is also shaped in such a manner as to present a circular section (section normal to the axis Y). Thus, the structure 14 and the heater tube 17 define between them an inside space of annular section (section normal to the axis Y) forming a treatment zone 43 for the gas. The heater tube 17 is also shaped in such a manner that its bottom end 44 is closed and arranged inside the structure 14, but without touching the bottom 42 of the structure 14. This makes it easier to deposit solid particles on the bottom 42 of the structure and thus to facilitate discharging them.

Nevertheless, the heater tube 17 presents height along the axis Y that is close to the height of the structure 14, typically lying in the range 90% to 99% of the height of the structure 14. The top end 45 of the heater tube opens out outside the structure 14, above the ceiling 46 of the structure 14.

In preferred manner, the heater tube 17 is made of ceramic. The selected ceramic preferably presents power density per unit area lying in the range 10 $kW/m^2$ to 50 $kW/m^2$. By way of example, the selected ceramic is alumina.

The heater means also include an inlet pipe 47 for a heating fuel (natural gas, fuel oil, purified synthesis gas, or indeed gas heated by the cracking furnace 13 itself, with a fraction of that gas being taken from the outlet 16 of the cracking furnace 13 in order to feed the inlet pipe 47, or indeed gas recovered from some other location, upstream or downstream from the device . . . ) connected to a burner 48 of said heater means, the burner 48 itself being connected to the top end 46 of the heater tube 17. The heater means also include an outlet pipe 49 for burnt fuel that is likewise connected to the top end 45 of the heater tube 17.

Preferably, the heater means begin by using a heating fuel external to the cracking furnace 13 in order to initiate heating of the heater tube 17 (of natural gas, fuel oil, purified synthesis gas, . . . , type) and once treatment of the gas has begun, the heater means take a fraction of the exhaust gas E at the outlet from the purification system (specifically the purification stage 21) for heating the heater tube 17 (as described below).

As a result, the cracking furnace 13 is relatively independent and requires external fuel only in order to initiate the beginning of cracking.

External fuel could also be used in operation, when merely taking treated gas from the outlet 16 of the cracking furnace 13 is not sufficient for feeding the burner.

It can thus be seen that the gas for treatment is heated indirectly, since there is no physical contact between the heating gas or the fuel and the gas for treatment: only the heater tube 17 and the refractory inside walls of the structure 14 serve to heat the gas for treatment.

The particular configuration of the structure 14 and of the associated heater tube 17 thus serves to define a narrow treatment zone 43 in which the gas for treatment is confined all along its passage through the structure 14, the treatment zone 43 being heated externally by the inside refractory walls of the structure 14 and being heated internally by the heater tube 17. This makes it possible to obtain uniform heating of the gas for treatment throughout the treatment zone, thereby ensuring good cracking of the undesired tars and oil phases.

Figure 3:
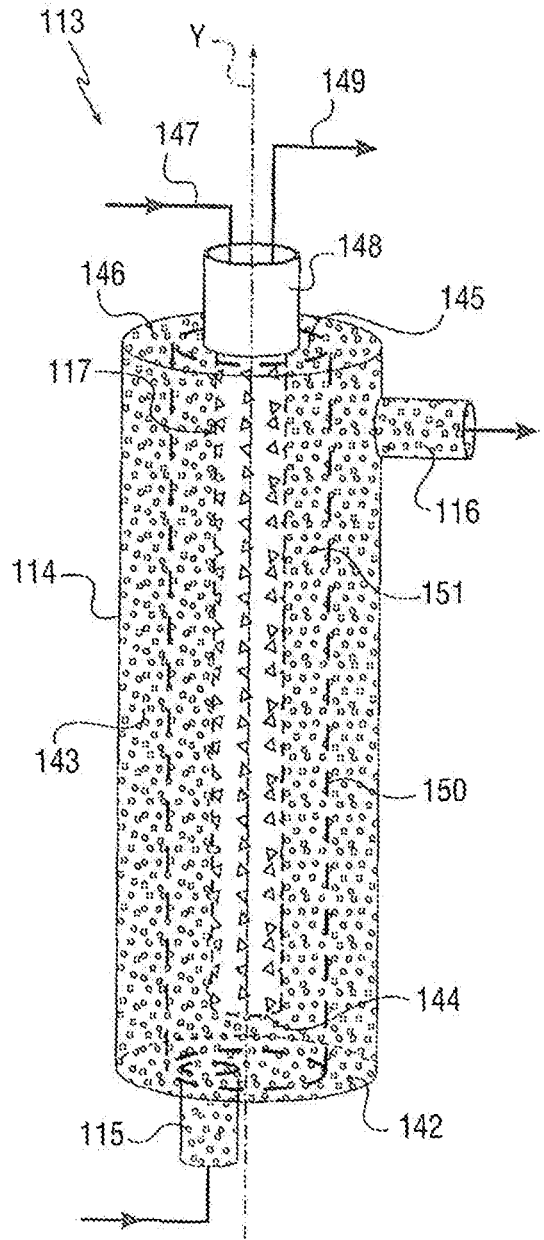
FIG. 3 is a diagrammatic view of a cracking furnace constituting a variant of the furnace shown in FIG. 2.

With reference to FIG. 3, in a variant, the means for discharging solid particles no longer include a discharge pipe and an associated valve, but rather a filter 150 extending vertically along the axis Y inside the structure 114, coaxially with said structure 114 and with the heater tube 117, so that the heater tube 117 extends inside the filter 150 within the structure 114. The filter 150 in this example is also shaped so as to present a circular section (section normal to the axis Y). The filter 150 is of height equal to the height of the structure 114 so as to be secured firstly to the ceiling 146 of the structure 114 and secondly to the bottom 142 of the structure 114.

As a result, the structure 114 and the heater tube 117 continue to define between them an inside space that forms a treatment zone 143 for the gas, however the filter 150 and the heater tube 117 also define a gas filter zone 151, likewise between them.

By way of example, the filter 150 is made of ceramic.

In this example, the inlet 115 of the structure 114 is shaped to open out directly into said gas filter zone 151. For this purpose, the inlet 115 opens out in the bottom 142 of the structure 114 into said filter zone 151. The outlet 116 is shaped to open out from the treatment zone 143, but outside the filter zone 151.

In both variants, the cracking furnace is shaped to subject the gas to a temperature lying in the range 1000° C. (degrees Celsius) to 1700° C., and preferably in the range 1000° C. to 1200° C. The cracking furnace 13 is preferably shaped to subject the gas to a temperature of about 1050° C. to 1200° C.

This serves not only to eliminate tar and oil phases from the gas, but also to enrich the gas in dihydrogen. Specifically, because of the high temperature, methane present in the gas also reacts during cracking as a result of the presence of other molecules, thereby serving to increase the proportion of dihydrogen in the gas.

Furthermore, in this example, the cracking furnace 13 is shaped so that the gas passes through the structure 14 with a transit time that is short, typically in the range 0.5 seconds (s) to 2 s.

In this example, the elimination unit 12 also includes filter means 19, e.g. connected directly to the outlet of the cracking furnace 13 in order to eliminate solid particles and dust still present in the gas, and in particular to eliminate the semicrystalline carbon particles present in the gas. The filter means 19 typically comprise a high temperature cyclone and/or a high temperature filter (such as a ceramic filter), and/or an active carbon filter arranged across the channel connected to the outlet of the cracking furnace 13. The cyclone and/or the filter can thus withstand temperatures that are high, typically lying in the range 600° C. to 1000° C.

The elimination unit 12 preferably also includes a heat exchanger 20 that is connected directly to the filter means 19 (upstream or downstream relative to the filter means 19 depending on the temperature at which said filter means 19 can operate), thus making it possible to cool the gas to a temperature that is compatible with the downstream end of the device. The temperature of the gas at the outlet from the heat exchanger 20 lies in the range 500° C. to 1000° C. and it is at a pressure that is slightly lower than atmospheric pressure.

At the outlet from the elimination unit 12, the gas already presents a high content of dihydrogen lying in the range 55% to 65% of the total volume when treating RDF or plastics material (but in the range 20% to 40% when treating biomass).

Furthermore, the device includes a purification system 21 for dihydrogen purification of the gas at the outlet from the elimination unit 12. In this example, the dihydrogen purification system 21 is connected directly to the outlet of the heat exchanger 20.

According to a particular aspect of the invention, the purification system 21 has a preparation stage for preparing the gas and a purification stage for purifying the gas.

By way of example, the preparation stage comprises first gas dryer means 30 that are connected to the outlet of the elimination unit 12.

The preparation stage also comprises means for pressurizing the gas, typically using a supercharger 31. The supercharger 31 is typically connected to the gas dryer means 30.

The preparation stage also includes a compressor 32 connected to the outlet from the supercharger 31 together with second gas dryer means 33 connected to the outlet from the compressor 32.

This preparation step serves typically to remove the water present in the gas and also to compress the gas before it reaches the purification stage.

In particular manner, the gas purification stage comprises pressure swing adsorption apparatus 34, which apparatus is directly connected to the outlet from the gas preparation stage.

This makes it possible, in a single operation, to remove practically all of the methane and also all of the carbon monoxide and the carbon dioxide and other minority components (such as water for example) still present in the gas.

At the outlet from the purification stage, i.e. at the outlet from the purification system 21, very pure dihydrogen gas G is thus recovered. Typically, the gas G at the outlet from the purification system comprises more than 99.9% dihydrogen by volume.

It should be observed that the dihydrogen gas G at the outlet from the pressure swing adsorption apparatus 34 is sufficiently pure to be able to be stored or used directly. There is therefore no need for some other machine of the membrane separator machine type after the pressure swing adsorption apparatus 34.

It should also be observed that the pressure swing adsorption apparatus 34 serves to obtain exhaust gas E that is poorer in dihydrogen (nevertheless about 25% by volume)

that can be recycled for example by being reused by the cracking furnace 13 (as mentioned above) or indeed by being used in the energy field because of its methane content. For energy optimization purposes, it is possible for example to produce electricity by combustion of this gas in a gas engine.

There follows a description of the method of manufacturing dihydrogen using the above-described device.

Initially, the substance for treatment is introduced into the inlet stack 5 in the form of divided solids and the screw 10 pushes the divided solids continuously towards the low outlet 6 of the enclosure 1. Because of the temperature of the screw 10, the divided solids soften progressively until they melt, thereby generating gas that already contains dihydrogen.

The screw 10 thus serves both to apply heat treatment to the substance and to convey the substance.

Preferably, the heat treatment of the substance takes place at high temperature inside the enclosure 1, typically at a temperature in the range 500° C. to 1000° C., and preferably in the range 600° C. to 800° C.

Preferably, the device is shaped so that the substance remains inside the enclosure for a period in the range 10 minutes (min) to 30 min, and more preferably in the range 15 min to 20 min.

This serves to pyrolize the substance effectively and thereby recover from the high outlet 11 of the enclosure 1 a gas that already has a very high content of dihydrogen.

The carbon residue of the substance is then discharged through the low outlet 6.

Figure 2:
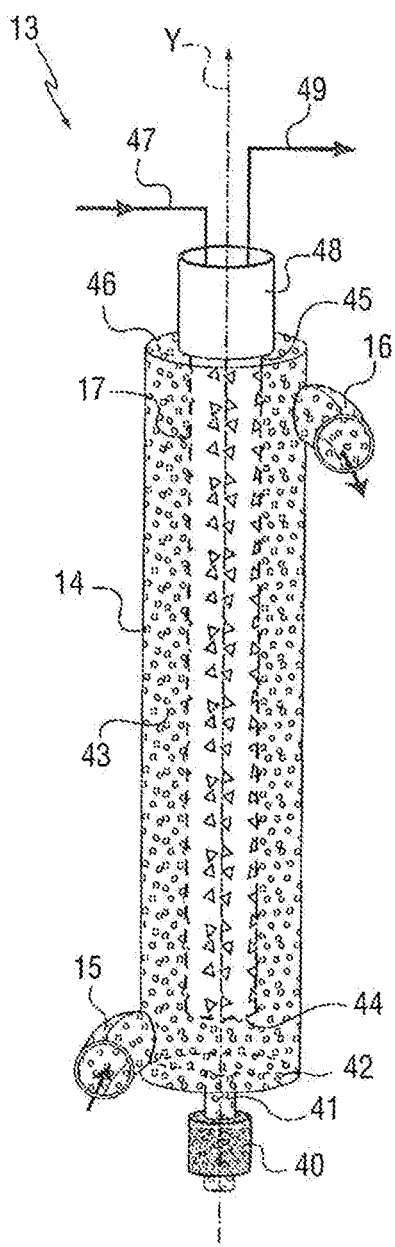
FIG. 2 is a diagrammatic view of a cracking furnace of the device shown in FIG. 1.

Furthermore, the gas extracted from the high outlet 11 of the enclosure 1 is introduced into the cracking furnace 13 via the inlet 15. In parallel, the burner 48 burns the heating fuel, thereby discharging a heating gas (represented by triangles in FIG. 2) in the heater tube 17. Said heater gas then moves down in the heater tube 17 prior to rising naturally towards the top end 15 of the heater tube 17 where it is discharged via the outlet pipe 16 to the outside of the cracking furnace 13. The presence of the heater gas and its movement enable the heater tube 17 to be heated effectively over its entire height, thereby heating the treatment zone 43 by convection (from the heater tube 17) and by radiation (from the particular material that constitutes the structure 14). The gas for treatment is thus heated effectively, quickly, and uniformly to the temperature needed for thermally cracking oils and tars present in said gas, and also for thermally cracking methane in order to enrich the gas in dihydrogen. The cracking furnace 13 thus heats the gas to a temperature of about 1500° C.

The gas for treatment flows naturally within the cracking furnace 13 between the low inlet 15 to the structure 14 and the high outlet 16 from the structure 14, and advantageously it flows helically as a result of the cyclone effect generated by the tangential arrangement of the inlet 15, the gas flowing throughout the treatment zone 43, thereby leaving enough time for it to be treated properly prior to being discharged from the structure 14 via the outlet 16. A gas is thus recovered from the outlet of the cracking furnace 13 that contains about 60% dihydrogen by volume.

The gas then passes through the remainder of the elimination unit 12. A cleaner gas is thus recovered from the outlet of said eliminating unit 12, which gas is also enriched in dihydrogen. At the outlet from the eliminating unit 12, a gas is thus recovered that comprises about 60% dihydrogen by volume.

Thereafter, the gas passes through the purification system 21 serving in turn to remove in succession water, carbon dioxide, dinitrogen, and methane. A gas G is thus recovered from the outlet of the device that is purer concerning its dihydrogen content.

The gas G at the outlet from the purification system, and thus from the device, is thus found to have a very high dihydrogen content. Typically, the gas G at the outlet from the device presents a dihydrogen content greater than 99.99%.

Naturally, the invention is not limited to the embodiment described and embodiment variants may be applied thereto without going beyond the ambit of the invention as defined by the claims.

In particular, although in this example the substance fed to the device is plastics material containing a majority of polyethylene and of polyethylene terephthalate, the device could use some other type of substance for producing dihydrogen. By way of example, the substance could thus equally well be: a biomass, a solid polymer, such as plastics waste, rubber, or elastomer, or indeed a solid comprising card, a metal material such as aluminum, . . . , or indeed solid refuse derived fuel. It should be recalled that the term "biomass" designates biodegradable fractions of substances, waste, and residue possibly coming from industry in general and from agriculture, sylviculture, and associated industries, in particular.

The substance may comprise a single type of solid (polymer, plastics, RDR, biomass, . . . ), or a plurality of types of solid. The divided solids may be in the form of three-dimensional granules or in the form of two-dimensional flakes. In general manner, the divided solids may be in the form of powder, granules, pieces, fibers, . . . .

Furthermore, the enclosure and the conveyor and fuel effect heater means associated therewith could be different from those described. For example, the sealed connection means at the feed inlet and/or at the low outlet may include elements other than an airlock, such as for example a hatch or indeed a metering apparatus. The screw and the associated Joule effect heater means may be shaped to allow the substance to be heated in stages, e.g. with the screw presenting electrical resistance that varies along its axis so as to provide simultaneously different heating zones along its axis.

Likewise, the purification system may be different from that described. For example, said system may have a number of purification stages different from that described.

The device may be shaped so that the enclosure is filled with an inert gas in order to limit or eliminate the presence of oxygen in the enclosure.

The cracking furnace may differ from that described. Thus, although the structure described presents a section that is circular, the structure could present a section that is different, such as an elliptical section. Nevertheless, it is preferable to have a structure of circular section since that enhances heat exchanges within the treatment zone. Likewise, the heater tube may present a section that is different from a circular section, e.g. an elliptical section. Nevertheless, it is preferable to have a heater tube of circular section since that enhances heat exchanges with the treatment zone. In any event, it is preferable for the cracking furnace in which the heater tube and the structure present the same shape in section, thereby enhancing heat exchanges within the treatment zone.

Although the structure is described herein as being made of alumina, the structure could be made of any other material: another ceramic, refractory concrete, a metal or metal alloy, . . . . Nevertheless, it is preferable to use refractory materials such as refractory concrete or ceramic to enhance treatment of the gas. In addition, consideration should be given to the nature of the gas for treatment (in particular whether or not it is corrosive).

Although in this example the heater tube is made of alumina, the heater tube could be made of any other material: another ceramic, a refractory concrete, a metal or metal alloy, . . . . Nevertheless, it is preferable to use refractory materials such as refractory concrete or ceramic, which enhance treatment of the gas. In addition, consideration should also be given to the nature of the gas for treatment (in particular whether or not it is corrosive).

Although the filter herein is made of alumina, the filter could be made of any other material: another ceramic, a refractory concrete, a metal or metal alloy, . . . . Nevertheless, it is preferable to use refractory materials such as refractory concrete or ceramic, which enhance treatment of the gas. In addition, consideration should also be given to the nature of the gas for treatment (in particular whether or not it is corrosive).

The invention claimed is:

1. A device for producing dihydrogen gas by applying heat treatment to a substance in a form of divided solids, the device comprising:
    an enclosure having an inlet for feeding the enclosure with the substance, a low outlet for recovering residues from the treated substance, and a high outlet for extracting the dihydrogen gas comprising impurities resulting from the treatment of the substance;
    conveyor means for conveying the substance between the inlet of the enclosure and the low outlet of the enclosure, wherein the conveyor means comprises a screw mounted to rotate inside the enclosure about an axis of rotation and means for driving the screw in rotation;
    heater means for heating the screw by the Joule effect, wherein the heater means comprises a current generator for generating electric current and connects two ends of the screw to two polarities of the current generator;
    an impurity elimination unit for eliminating the impurities present in the dihydrogen gas, the impurity elimination unit being connected to the high outlet of the enclosure; and
    a cooling unit connected to the low outlet for cooling the residues,
    wherein the impurity elimination unit is connected to the high outlet so that the dihydrogen gas is extracted continuously from the enclosure, and the supply of substance and the removal of residues take place in discontinuous manner.

2. The device according to claim 1, further comprising a purification system for purifying the dihydrogen gas at a first outlet from the impurity elimination unit, the purification system being connected to the impurity elimination unit.

3. The device according to claim 2, wherein the purification system comprises a single purification stage.

4. The device according to claim 2, wherein the purification system comprises a pressure swing adsorption apparatus.

5. The device according to claim 2, wherein an exhaust gas from the purification system is used by the impurity elimination unit to treat the dihydrogen gas coming from the heat treatment of the substance.

6. The device according to claim 1, further comprising an inlet chimney stack, wherein the inlet chimney stack is connected to the inlet of the enclosure and comprises a sealed connection means connected to the inlet of the enclosure in such a manner as to limit an entry of air into the enclosure.

7. The device according to claim 1, further comprising an outlet chimney stack, wherein the outlet chimney stack is connected to the low outlet of the enclosure and comprises a sealed connection means connected to the low outlet of the enclosure in such a manner as to limit an entry of air into the enclosure.

8. The device according to claim 1, wherein the impurity elimination unit comprises cracking means for cracking the dihydrogen gas.

9. The device according to claim 1, wherein the impurity elimination unit comprises filter means for filtering dust, solid particles present in the dihydrogen gas, and particles based on semi-crystalline carbon.

10. The device according to claim 9, wherein the filter means are connected to a second outlet from the cracking means.

11. The device according to claim 9, wherein the filter means comprises a high-temperature cyclone, a high-temperature ceramic filter or an active carbon filter.

12. The device according to claim 1, wherein the substance feeding the enclosure is refuse derived fuel (RDF) material or polymer material.

13. A method of producing dihydrogen gas from the device according to claim 1, the method comprising the steps of:
    pyrolyzing the substance;
    eliminating the impurities present in the dihydrogen gas.

* * * * *